US006543410B2

(12) United States Patent
Yoshida et al.

(10) Patent No.: US 6,543,410 B2
(45) Date of Patent: Apr. 8, 2003

(54) DIRECT INJECTION ENGINE

(75) Inventors: Yoshiyuki Yoshida, Hitachinaka (JP);
Hidefumi Iwaki, Hitachinaka (JP);
Toshio Hori, Hitachinaka (JP);
Kentarou Shiga, Mito (JP); Yoshikuni Kurashima, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/790,553

(22) Filed: Feb. 23, 2001

(65) Prior Publication Data

US 2002/0011234 A1 Jan. 31, 2002

(30) Foreign Application Priority Data

Jul. 25, 2000 (JP) ........................................ 2000-224168

(51) Int. Cl.[7] ................................................ F02B 17/00
(52) U.S. Cl. ................... 123/301; 123/568.21; 123/302
(58) Field of Search ................................ 123/295, 301, 123/302, 568.21, 306, 308

(56) References Cited

U.S. PATENT DOCUMENTS

| 4,475,524 A | * | 10/1984 | Eckert et al. .......... 123/568.21 |
| 4,702,207 A | * | 10/1987 | Hatamura et al. ........... 123/302 |
| 5,218,937 A | * | 6/1993 | Matsura ...................... 123/301 |
| 5,261,373 A | * | 11/1993 | Ohsuga et al. .............. 123/430 |
| 5,640,941 A | * | 6/1997 | Hazen et al. ................ 123/306 |
| 5,870,993 A | * | 2/1999 | Stellet et al. ............... 123/308 |
| 5,878,712 A | * | 3/1999 | Wolters et al. .............. 123/301 |
| 5,894,826 A | * | 4/1999 | Jaye ........................... 123/295 |
| 5,906,183 A | * | 5/1999 | Echtle et al. ................ 123/301 |
| 6,138,639 A | * | 10/2000 | Hiraya et al. ................ 123/301 |
| 6,199,534 B1 | * | 3/2001 | Tokuyasu et al. ........... 123/301 |

FOREIGN PATENT DOCUMENTS

JP    7-103078    4/1995

* cited by examiner

*Primary Examiner*—Erick Solis
(74) *Attorney, Agent, or Firm*—Crowell & Moring LLP

(57) ABSTRACT

In a direct injection engine capable of reducing an amount of NOx discharged as much as possible, realizing EGR in a large amount, and enlarging a stable burning limit, fuel injection valves for directly injecting fuel into combustion chambers are arranged, ignition plugs are provided in the combustion chambers to face the same, intake ports for generating a tumble gas flow in the combustion chambers are provided. The intake ports are compartmented by partitions into high velocity port portions having a high flow velocity of intake air and low velocity port portions having a low flow velocity of intake air, passage valves for opening and closing the port portions are arranged near upstream ends of the low velocity port portions, and an EGR passage for introducing an EGR gas is connected to the low velocity port portions.

10 Claims, 10 Drawing Sheets

EGR GAS ($CO_2$) CONCENTRATION
A>B>C

DIRECT INJECTION ENGINE

BACKGROUND OF THE INVENTION

1. Field of the Invention

The invention relates to a direct injection engine structured such as to directly inject a fuel to a combustion chamber so as to supply, and more particularly to a direct injection engine mainly aiming to reduce a discharging amount of a harmful NOx component as much as possible.

2. Description of the Related Art

Recently, direct injection engines, in which a fuel is directly injected and supplied to combustion chambers, have spread as an on-vehicle four cycle gasoline engine. With such direct injection engines, an intake air is ordinarily sucked to generate a swirling vortex in combustion chambers (swirling, tumble flow or the like) so as to effect stratified charge combustion (combustion in a state, in which a layer of mixture having a rich air-fuel ratio is formed near ignition plugs provided facing combustion chambers, and a layer of mixture having a lean air-fuel ratio (an air layer) is formed toward side wall surfaces (outer peripheries) of the combustion chambers with distance from the ignition plugs. Thereby, super-lean burn operation is made possible, and pumping loss and heat loss are reduced to achieve improvement in fuel consumption.

Further, the invention described in Japanese Unexamined Patent Publication No. 7-103078 relates to an EGR (exhaust gas recirculation) system for direct injection type engines, in which an EGR gas recirculated around an ignition plug facing a central portion of a combustion chamber is concentrated and supplied to the combustion chamber in each of cylinders, and an EGR control valve is provided in an EGR duct to control an amount of EGR gas recirculated.

In the former direct injection engine mentioned above, however, a NOx component discharged during the lean burn operation cannot be purified by a normal ternary catalyst, and is discharged to the atmosphere. Further, since restrictions are put on time of lean burn operation and an amount of NOx in spite of the use of NOx catalysts, reduction in an amount of NOx discharged (generated) in an engine out (combustion chamber) has counted for much. To cope with this, it may be effective to perform EGR for recirculating exhaust gases to combustion chambers via an intake system from an exhaust system.

However, with conventional direct injection engines, execution of EGR enables reduction in an amount of Nox discharged to some extent but deteriorates quality of combustion, which puts restrictions on an amount of exhaust gases being subjected to EGR to make it difficult to perform EGR in a large amount and to make enlargement of stable burn limit impossible.

Also, with the EGR system for direct injection type engines, an EGR gas is supplied around an ignition plug at a central portion, and the EGR gas and an intake air are supplied to a combustion chamber in a swirling manner at the same flow velocity. Therefore, the intake air does not act to positively surround the EGR gas at a centeral portion of the combustion chamber, and stability of stratified charge combustion in a vertical direction of the combustion chamber is not taken account of, resulting in problems that reduction in an amount of NOx discharged should be improved, and when an amount of EGR gas recirculated is increased, reduction in output is caused.

SUMMARY OF THE INVENTION

The invention has been made in view of the problems mentioned above, and has its object to provide a direct injection engine capable of reducing an amount of NOx discharged as much as possible, realizing EGR in a large amount, and enlarging a stable burning limit.

In order to achieve the object mentioned above, the invention provides a direct injection engine comprising intake ports for supplying an air and an EGR gas to combustion chambers, fuel injection valves directly injecting a fuel, and ignition plugs, and wherein the air and the EGR gas are supplied to the combustion chambers such that the air having a large flow velocity and the EGR gas having a small flow velocity generate a tumble gas flow so as to provide a state of distribution, in which near the ignition plugs, an air-fuel ratio is on a rich side with a less fresh air and a much EGR gas, and with distance from the ignition plugs, the air-fuel ratio comes to a lean side with a much fresh air and a less EGR gas.

Further, in a preferred embodiment of the invention, the direct injection engine comprises intake ports and combustion chambers, which have fuel injection valves and into which fuel is directly injected, and the intake ports, respectively, are partitioned into a high velocity port portion having a high intake flow velocity and a low velocity port portion having a low intake flow velocity, and an EGR gas is introduced into the low velocity port portions.

Further, in another preferred embodiment of the invention, the direct injection engine comprises combustion chambers, in which fuel injection valves directly injecting a fuel and ignition plugs are arranged, and intake ports adapted to generate a tumble gas flow composed of an air and an EGR gas in the combustion chambers, and partitions compartment the respective intake ports into a high velocity port portion having a high intake flow velocity and a low velocity port portion having a low intake flow velocity, and wherein passage valves for opening and closing the port portions are arranged near upstream ends of the low velocity port portions, and EGR passages for introduction of the EGR gas are connected to the low velocity port portions. Further, in a further preferred embodiment of the invention, it is preferable that the intake ports, respectively, in all the cylinders of the engine are compartmented by partitions into a high velocity port portion having a high intake flow velocity and a low velocity port portion having a low intake flow velocity, and EGR gas introduction ports are provided in the low velocity port portions in all the cylinders.

In another preferred embodiment of the invention, EGR passages are provided to connect the low velocity port portions of the respective cylinders to exhaust passages, make a single common passage portion at upstream sides thereof and make at downstream sides thereof branch passage portions, which branch from the common passage portion to be connected to the respective low velocity port portions, and an EGR control valve is provided in the common passage portion. In a further preferred embodiment of the invention, an amount of the EGR gas introduced is regulated by controlling opening degrees of the passage valves.

Meanwhile, the invention provides a method of effecting stratified charge combustion in a direct injection engine, in which an air and an EGR gas are supplied to combustion chambers and a fuel is directly injected into the combustion chambers, the method comprising the step of effecting stratified charge combustion by producing through a tumble gas flow a state of distribution, in which near ignition plugs in the combustion chambers, an air-fuel ratio is on a rich side with a less fresh air and a much EGR gas, and with distance from the ignition plugs, the air-fuel ratio comes to a lean side with a much fresh air and a less EGR gas. And at the time of initial combustion, combustion is effected in a state, in which combustion temperature is suppressed, and after the middle period of combustion, combustion proceeds in a state, in which the combustion temperature is suppressed.

In a preferred embodiment of a direct injection engine according to the invention constructed in a manner mentioned above, an EGR gas is introduced individually into (low velocity port portions) respective cylinders. Therefore, as compared with a conventional direct injection engine, in which an EGR gas is introduced in lump into a collecting passage portion (in an upstream side from intake ports) of an intake passage, improvement according to the invention is achieved in delivering quality to reduce dispersion in amounts of an EGR gas among respective cylinders, whereby a lean limit air-fuel ratio can be coordinated among all the cylinders to realize EGR in large amount.

Also, in a direct injection engine, an intake air is ordinarily sucked into combustion chambers in a manner as to generate a tumble flow and stratified charge combustion is effected such that an air-fuel ratio becomes rich near ignition plugs, so that when an EGR gas is introduced into the low velocity port portions of the intake ports in the above-mentioned manner, a flow velocity of a swirling vortex flow of an intake air, which contains the EGR gas sucked into the combustion chambers from the low velocity port portions, is smaller than a flow velocity of a swirling vortex of an intake air composed only of an air sucked into the combustion chambers from the high velocity port portions. Accordingly, there are successively formed from near the ignition plugs toward an outer periphery thereof in a vertical direction a layer substantially composed only of the EGR gas, an intake air layer containing EGR gas in a large amount, and an intake air layer substantially composed only of an air, resulting in a state, in which the EGR gas is surrounded by an air (fresh air $O_2$) in a vertical direction. In other words, near the ignition plugs in the combustion chambers, an air-fuel ratio is on a rich side with a little fresh air and a much EGR gas, and comes to a lean side with distance from the ignition plugs to lead to a state of distribution with a much fresh air and a less EGR gas. As a result, an initial combustion occurring near the ignition plugs becomes combustion with an air containing an EGR gas in a large amount, so that as compared with the prior art, combustion decreases in temperature to lead to reduction in an amount of NOx discharged, and a fresh air is supplied during flame propagation after the middle period of combustion, resulting in extinguishment of burning and accidental fire.

In this manner, with the direct injection engine according to the invention, an EGR gas is introduced individually into the respective cylinders and an intake air is stratified in the EGR gas level, so that an amount of an EGR gas is reduced in dispersion among the cylinders as compared with the conventional one, and temperature of burning is decreased. Moreover, since combustion occurs in a state, in which combustion temperature is suppressed, it is possible to sharply reduce an amount of NOx discharged and to enlarge a limit of stable combustion, and further an intake air is stratified to prolong a period of combustion, thus enabling reduction in an amount of HC discharged owing to after-burning or the like.

Further, negative pressures at the EGR gas introduction ports are changed by controlling the opening degrees of the passage valves arranged near the upstream ends of the low velocity port portions, whereby the passage valves make it possible to adjust amounts of EGR gas introduced. Therefore, with the prior art, the use of a stepping motor or the like is necessary to finely control the opening degree of the EGR control valve provided in the EGR passage for controlling an amount of EGR gas. With the invention, simple opening and closing of the EGR control valve suffices, so that the use of an inexpensive electro-magnetic valve (ON and OFF valve) is made possible to achieve reduction in cost.

DETAILED DESCRIPTION OF THE PREFERRED EMBODIMENTS

An explanation will be given to embodiments according to the invention with reference to the accompanying drawings.

Figure 1:
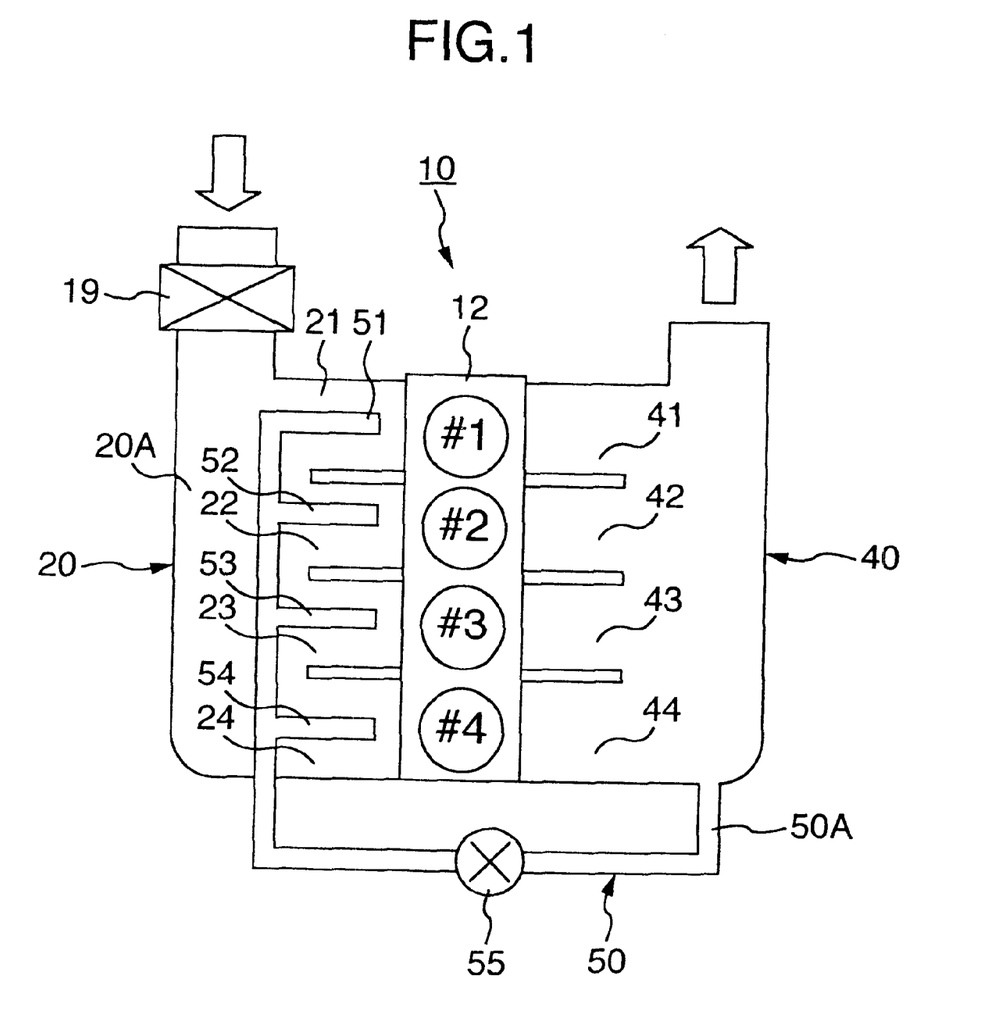
FIG. 1 is a schematic plan view showing one embodiment of a direct injection engine according to the invention.
Figure 2:
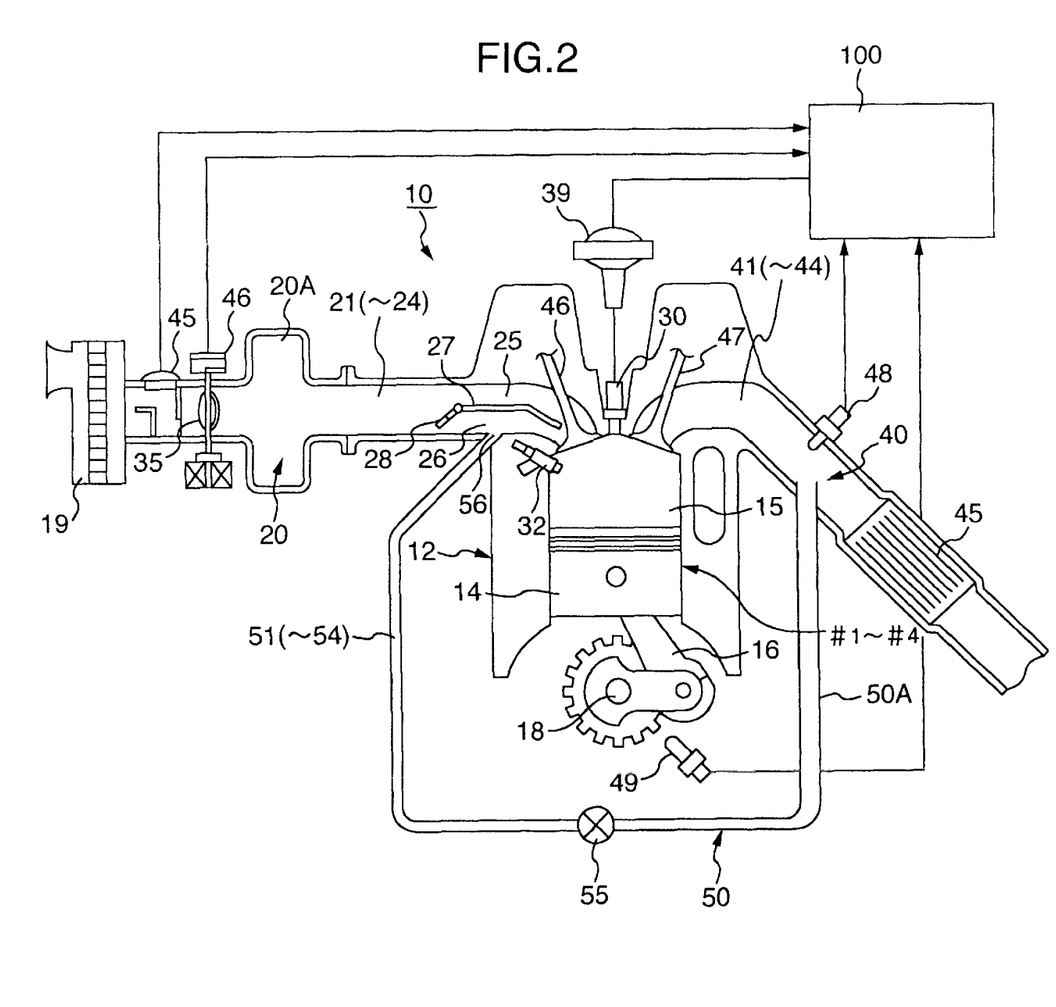
FIG. 2 is a schematic vertical cross sectional view of the direct injection engine shown in FIG. 1.

FIGS. 1 and 2 are a schematic plan view and a schematic vertical cross sectional view showing an embodiment of a direct injection engine according to the invention.

A direct injection engine 10 according to an illustrated embodiment is an in-line four-cylinder gasoline engine. Pistons 14 are fitted and inserted into respective cylinders #1 to #4 provided in a cylinder block 12, and reciprocation of the respective pistons 14 is converted into rotational movements of a crankshaft 18 via connecting rods 16. A combustion chamber 15 of, for example, a pent roof type is formed above the piston 14, intake ports 21, 22, 23 and 24 branching from a collecting passage portion 20A of an intake passage 20 are connected to the combustion chambers 15 in the respective cylinders #1 to #4, and exhaust ports 41, 42, 43 and 44 defining an upstream end portion of an exhaust passage 40 are also connected thereto.

Downstream ends of the intake ports 21 to 24 and upstream ends of the exhaust ports 41 to 44, respectively, are adapted to be opened and closed at predetermined timings by intake valves 46 and exhaust valves 47. The intake ports 21 to 24, respectively, are designed to generate a tumble gas flow in the combustion chambers 15, and a partition wall 27 partitions an interior of the respective intake ports vertically into a high velocity port portion 25 having a high intake flow velocity and a low velocity port portion 26 having a low intake flow velocity. A passage valve 28 for opening and closing the port portion 26 is arranged near an upstream end of the low velocity port portion 26.

An ignition plug 30 is provided adjacent to a center of a ceiling portion of the combustion chamber 15, and an ignition coil 39 is connected to the ignition plug 30. A fuel injection valve 32 for directly injecting and supplying fuel to the combustion chamber 15 is arranged in a peripheral edge portion on a side of the intake port 21 to 24 in the combustion chamber 15.

An air cleaner 19, an intake air amount sensor 45 and a throttle valve 35 in this order from the upstream side are arranged in the collecting passage portion 20A, which defines an upstream side of the intake passage 20. An air-fuel ratio sensor 48 and an exhaust gas purifying catalytic converter 45 are arranged in the exhaust passage 20.

Further, EGR passages 50 are provided to connect the exhaust passage 40 to the low velocity port portions 26 (EGR gas introduction ports 56) of the intake ports 21 to 24 in the respective cylinders #1 to #4. The EGR passages 50 are collected at upstream sides thereof into a common passage portion 50A and made at downstream sides thereof branching passage portions 51, 52, 53 and 54, which branch from the common passage portion 50A and connect to the EGR gas introduction ports 56 in the low velocity port portions 26. An EGR control valve 55 comprised of an electro-magnetic opening and closing valve for simply opening and closing (ON and OFF) the passage is provided in the common passage portion 50A.

Further, according to the present embodiment, a control unit 100 housing therein a microcomputer is provided for controlling respective parts of the engine, and is supplied with detection signals from the intake air amount sensor 45, a throttle opening degree sensor 46, a rotational speed sensor 49, an air-fuel ratio sensor 48 and the like. On the basis of the detection signals, the control unit 100 controls an amount of fuel injection, a timing of fuel injection and an ignition timing and controls an opening degree of the throttle valve 35, opening degrees of the passage valves 28 and an opening and closing action (ON/OFF) of the EGR control valve 55.

Figure 3:
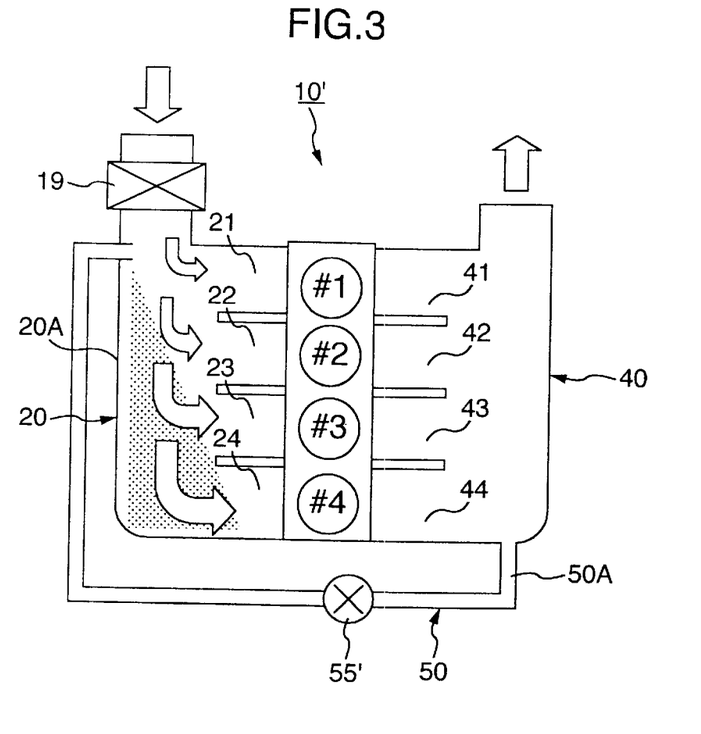
FIG. 3 is a schematic plan view showing one embodiment of a direct injection engine in accordance with a conventional art.

An explanation will be given below to a function and an effect of the direct injection engine 10 according to the present embodiment, constructed in the above-mentioned manner in comparison with a conventional direct injection engine 10' shown in FIG. 3, in which an EGR gas is introduced in lump into the collecting passage portion 20A (in an upstream side from the intake ports 21 to 24) of the intake passage 20.

Figure 4:
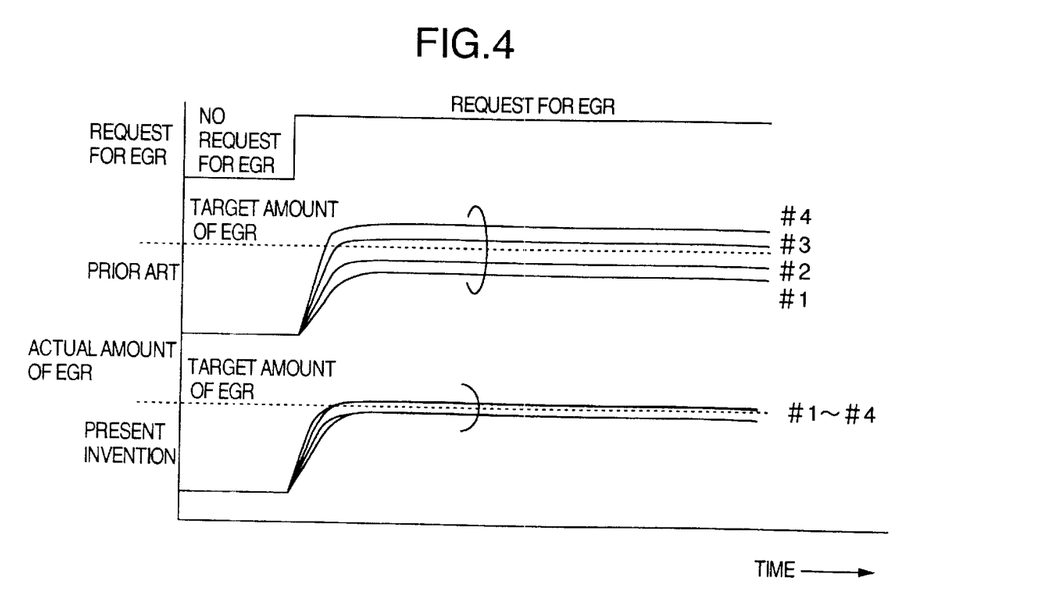
FIG. 4 is a view for explaining a dispersion of an introducing amount of EGR gas among cylinders, in the conventional direct injection engine.
Figure 5:
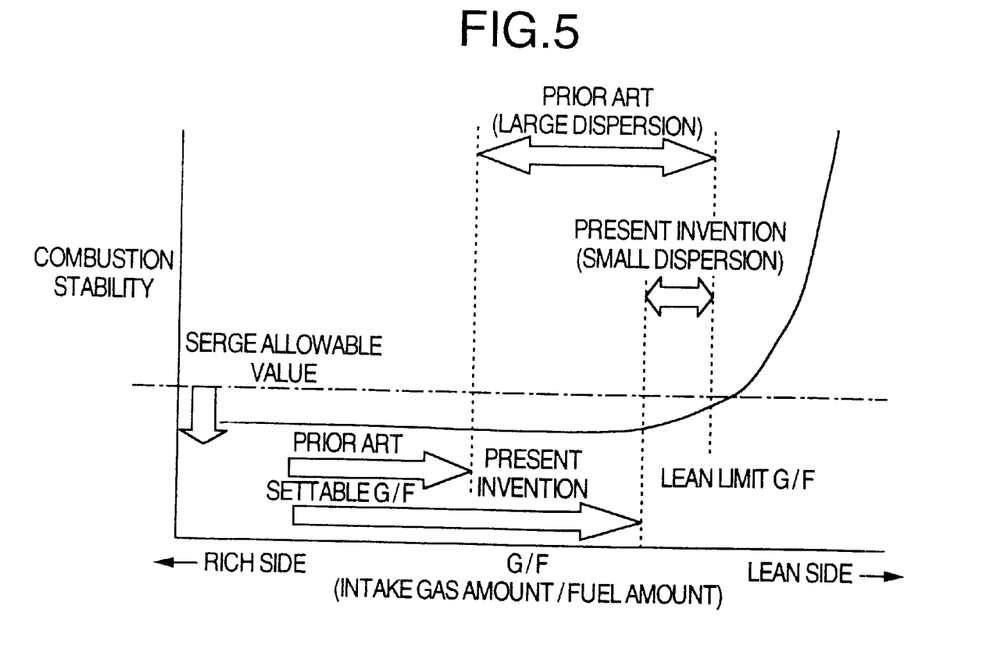
FIG. 5 is a view showing a relation between a combustion stability and a ratio between an intake gas amount and a fuel amount.

With the conventional direct injection engine 10', in which the EGR gas is introduced in the lump into the collecting passage portion 20A of the intake passage 20, amounts of EGR vary widely among the cylinders #1 to #4 as shown in FIG. 4, and in particular, amounts of EGR supplied to the cylinders #1 and #4 at the both ends are likely to deviate widely out of target amounts of EGR. In contrast, with the direct injection engine 10 according to the present embodiment (the invention), in which the EGR gas is introduced into (the low velocity port portion 26) the respective cylinders #1 to #4, improvement is achieved in delivering quality to reduce dispersion in amounts of the EGR gas among the respective cylinders #1 to #4. In this manner, amounts of the EGR gas is reduced in dispersion among the cylinders #1 to #4, whereby a lean limit air-fuel ratio (a ratio of an intake gas amount G to a fuel amount F) can be coordinated among all the cylinders #1 to #4 as shown in FIG. 5 to realize EGR in large amount and to set the lean limit ratio G/F on a lean side.

Figure 6:
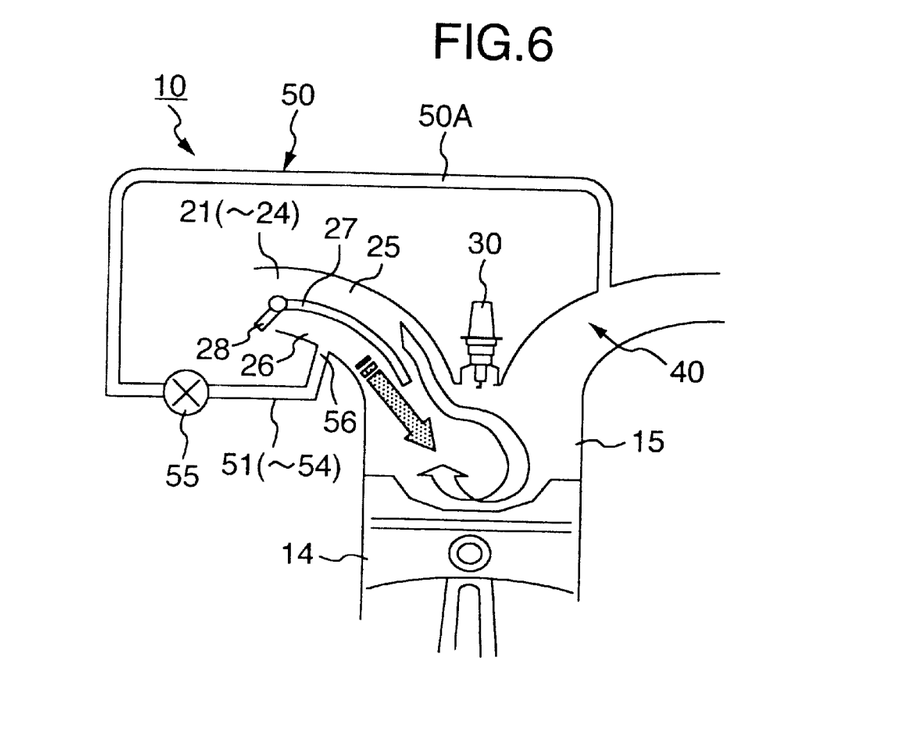
FIG. 6 is a schematic view for explaining a stratified charge combustion of a direct injection engine according to the invention.
Figure 7:
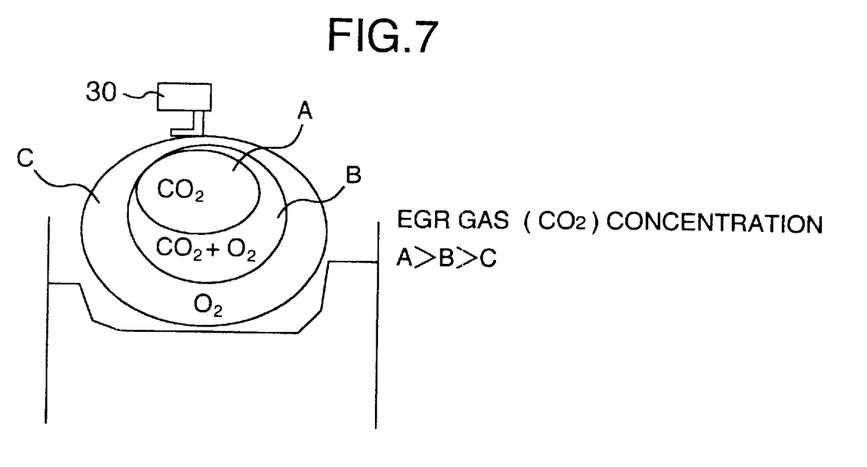
FIG. 7 is a schematic view of a stratified charge of an intake air in the direct injection engine according to the invention.
Figure 9A:
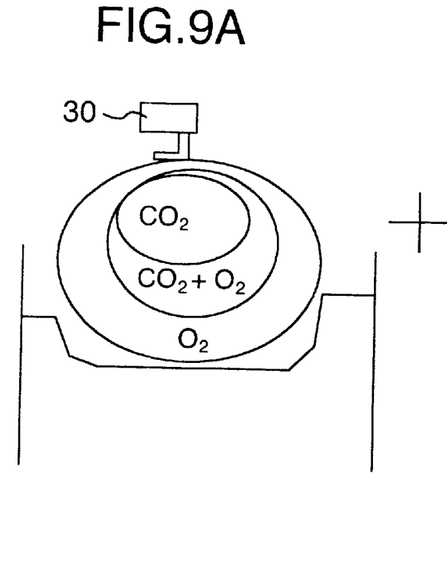
FIGS. 9A and 9B are views showing an intake air stratified charge distribution and a fuel stratified charge distribution in the direct injection engine according to the invention.
Figure 9B:
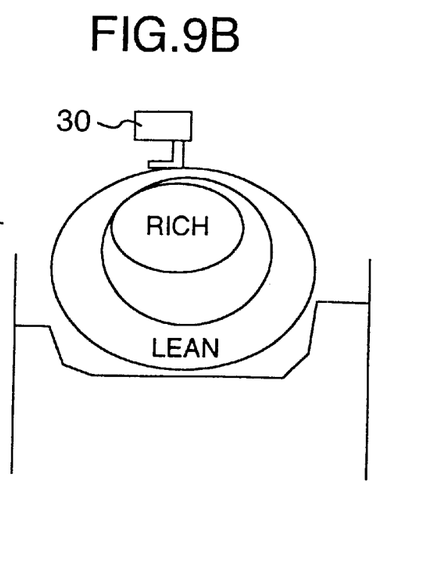

With the direct injection engine 10 according to the present embodiment, when the EGR gas is introduced into the low velocity port portions 26 of the intake ports 21 to 24, a flow velocity of a swirling vortex flow of an intake air, which contains the EGR gas sucked into the combustion chambers 15 from the low velocity port portions 26, is smaller, as shown in FIG. 6, than a flow velocity of a swirling vortex of an intake air composed only of an air sucked into the combustion chambers 15 from the high velocity port portions 25. Accordingly, as shown in FIGS. 7 and 9A, there are successively formed from near the ignition plugs 30 toward an outer periphery thereof a layer substantially composed only of the EGR gas ($CO_2$), an intake air layer ($CO_2+O_2$) containing EGR gas ($CO_2$) in a large amount, and an intake air layer substantially composed only of an air ($O_2$), so that a tumble gas flow in a vertical direction is formed such that the EGR gas ($CO_2$) is surrounded by an air (fresh air $O_2$). In other words, near the ignition plugs 30 of the combustion chambers 15, an air-fuel ratio is on a rich side with a little fresh air and a much EGR gas, and comes to a lean side with distance from the ignition plugs 30 to lead to a state of distribution with a much fresh air and a less EGR. Then, as shown in FIG. 9B, a fuel amount stratified charge distribution is formed such that an air-fuel ratio is on a rich side near the ignition plugs 30 and comes to a lean side with distance from the ignition plugs 30.

Figure 10A:
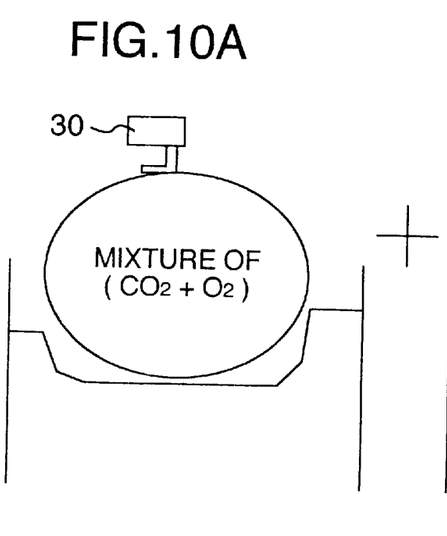
FIGS. 10A and 10B are views showing an intake air stratified charge distribution and a fuel stratified charge distribution in the direct injection engine in accordance with the conventional art.
Figure 10B:
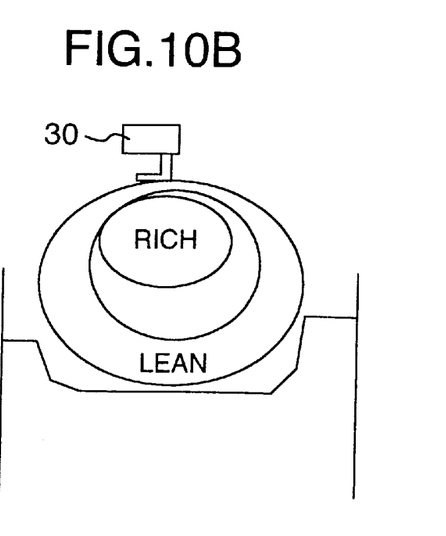

In contrast, the same is with the conventional direct injection engine 10' in that an intake air is sucked into the combustion chamber 15 in a manner as to generate a tumble flow and as shown in FIG. 10B, an air-fuel ratio is on a rich side near the ignition plugs 30 and an air-fuel ratio comes to a lean side with distance from the ignition plugs 30, but the EGR gas ($CO_2$) and the air ($O_2$) within the combustion chamber 15 are mixed as shown in FIG. 10A.

Figure 11A:
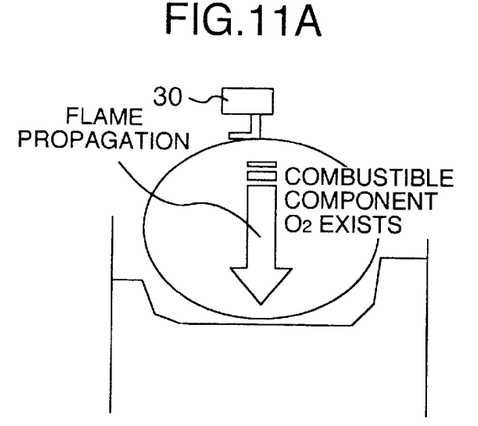
FIG. 11A is a view for explaining a burning characteristic of an after burning or the like in the direct injection engine according to the invention.
Figure 12:
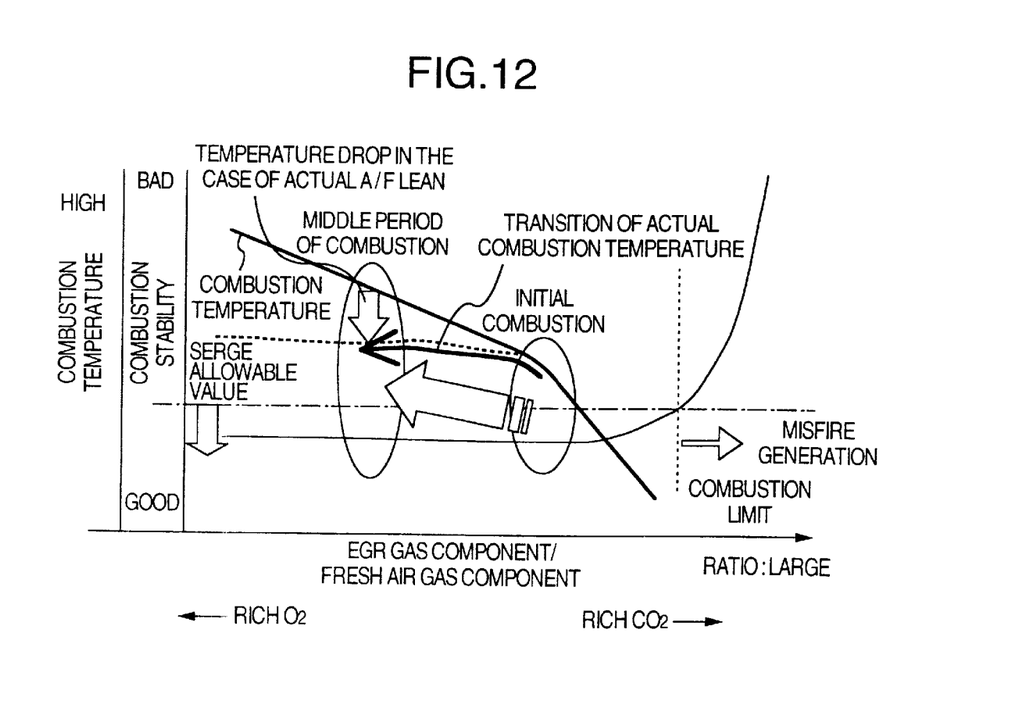
FIG. 12 is a view for explaining a burning temperature and a combustion stability in the direct injection engine according to the invention.

Therefore, with the direct injection engine 10 according to the invention, a fresh air is supplied during flame propagation even after the middle period of combustion as shown in FIG. 11A, so that a period of burning is extended, extinguishment of burning due to blowing and accidental fire are eliminated, and reduction in a discharge amount of discharge is achieved by afterburning. Further, as shown in FIG. 12, an initial combustion begins in a position where a ratio of an EGR gas to a fresh gas component (axis of abscissa) is large, that is, in a portion where the EGR gas is abundant, and a middle period combustion and a late period combustion are effected while burning gradually shifts to a portion, in which a EGR gas is scarce.

Figure 11B:
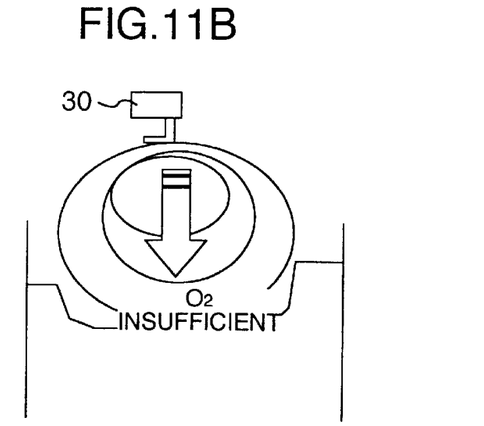
FIG. 11B is a view for explaining a burning characteristic of an after burning or the like in the direct injection engine in accordance with the conventional art.
Figure 13:
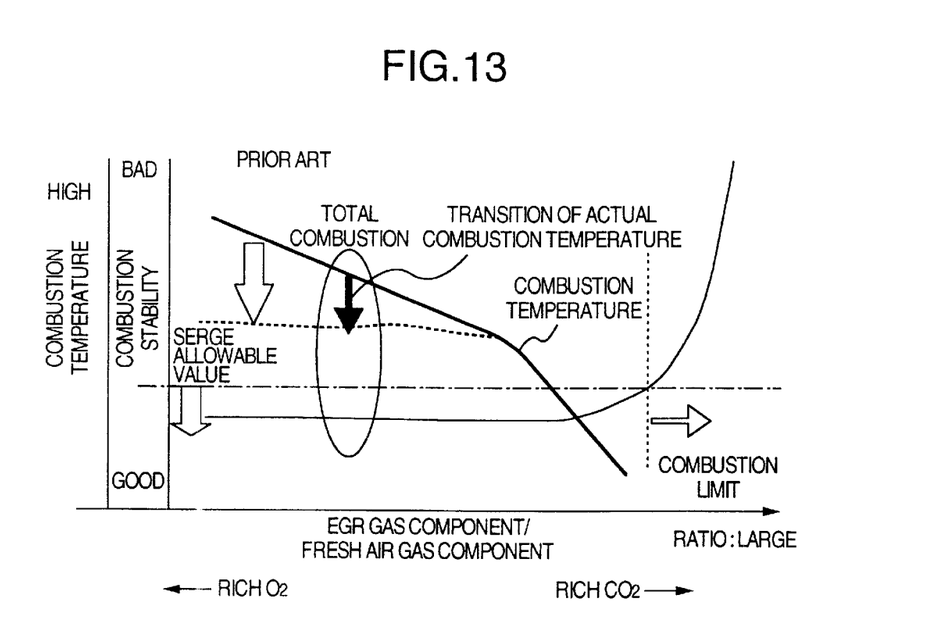
FIG. 13 is a view for explaining a burning temperature and a combustion stability in the direct injection engine in accordance with the conventional art.

In contrast, with the conventional direct injection engine 10', an air ($O_2$) is scarce even after the middle period of combustion as shown in FIG. 11B, so that a period of afterburning is short, and as shown in FIG. 13, a total burning occurs in a position where a ratio of an EGR gas to a fresh gas component (axis of abscissa) is substantially the same.

Figure 14:
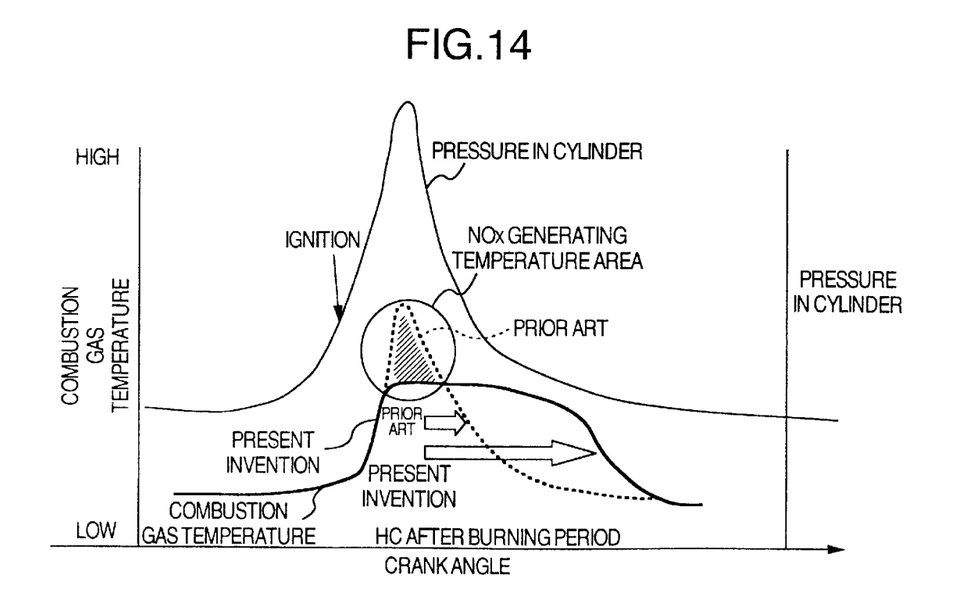
FIG. 14 is a view showing a relation between a temperature of combustion gas and a crank angle (a passing time) in the direct injection engines according to the invention and the conventional art.

Therefore, with the direct injection engine 10 according to the invention, as shown by a solid line in FIG. 14, temperature of a combustion gas at the time of initial combustion does not become so high, combustion occurs in a state, in which combustion temperature is lower than conventional combustion temperatures and suppressed, and besides combustion occurs, after the middle period of combustion, in a portion where the EGR gas becomes gradually scarce and the fresh air becomes abundant, so that temperature of a combustion gas goes on in substantially the same degree as that at the initial period of combustion.

In contrast, with the conventional direct injection engine 10', burning occurs in a portion with a rich air-fuel ratio, as shown by a broken line in FIG. 14, in the period of initial combustion, so that temperature of a combustion gas becomes significantly higher than that in the direct injection engine 10 according to the invention shown by a solid line in FIG. 14, and thereafter (after the middle period of combustion) burning occurs in a portion with a lean air-fuel ratio, resulting in rapid decrease in temperature of a combustion gas.

Figure 8:
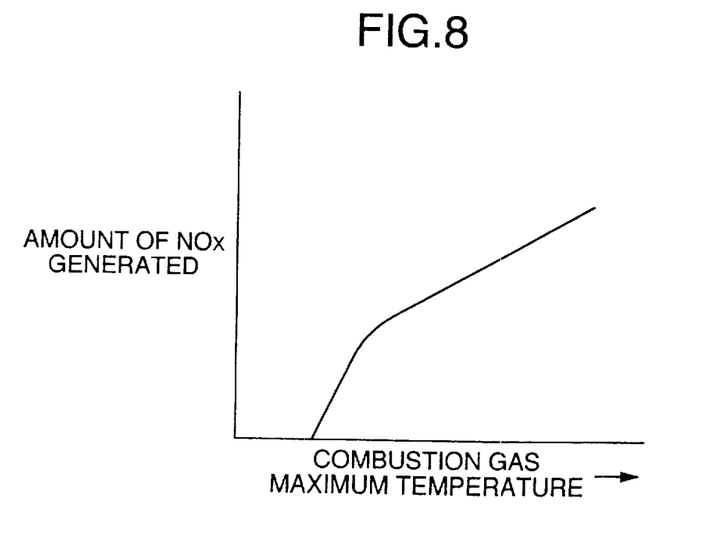
FIG. 8 is a view showing a relation between a generation amount of NOx and a temperature of combustion gas.

Generally, the higher a maximum temperature of a combustion gas, the more an amount of NOx generated, as shown in FIG. 8. In this case, with the direct injection engine 10 according to the invention, temperature of a combustion gas does not become so high in a period from the initial period of combustion to the last period of combustion, so that an amount of NOx discharged is reduced. In contrast, with the conventional direct injection engine 10', a protruding portion (portion surrounded by a circle) corresponding to the initial period of combustion in a curve shown by the broken curve in FIG. 14 becomes a temperature zone, in which a large amount of NOx is generated, with the result that an amount of NOx discharged increases significantly.

In this manner, with the direct injection engine 10 according to the present embodiment, the EGR gas is introduced individually into the respective cylinders #1 to #4 and an intake air is stratified in the EGR gas level, so that an amount of an EGR gas is reduced in dispersion among the cylinders as compared with the conventional one, and temperature of burning is decreased. Therefore, it is possible to sharply reduce an amount of NOx discharged and to enlarge a limit of stable combustion, and further an intake air is stratified to prolong a period of combustion, thus enabling reduction in an amount of HC discharged owing to afterburning or the like.

Figure 15:
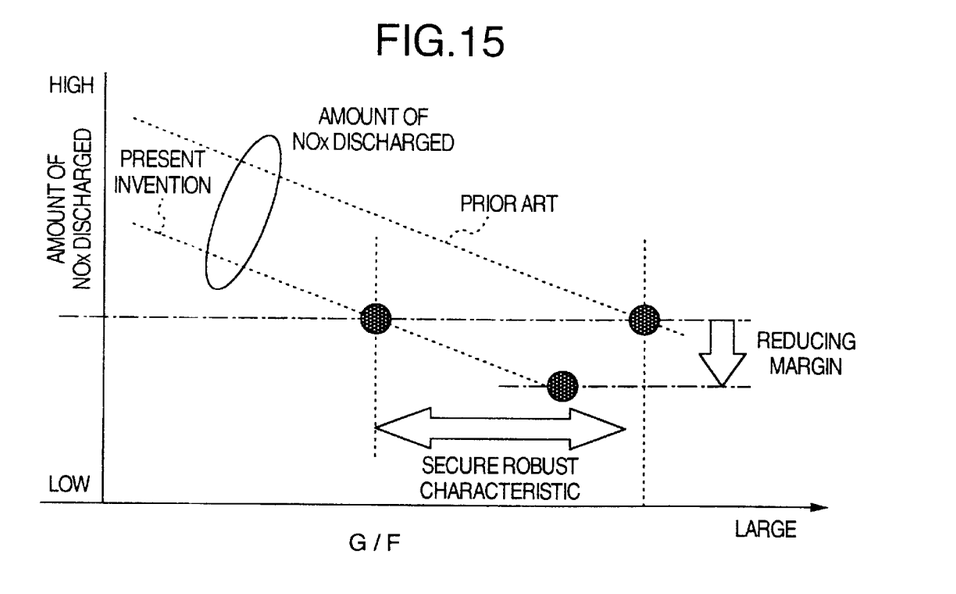
FIG. 15 is a view showing a relation between a discharge amount of NOx and a ratio between an intake gas amount and a fuel amount in the direct injection engines according to the invention and the conventional art.

In addition, the relation between an amount of NOx discharged and G/F for the direct injection engine 10 according to the invention and the conventional direct injection engine 10' is shown in FIG. 15, and a robust characteristic is secured according to the invention.

Figure 16:
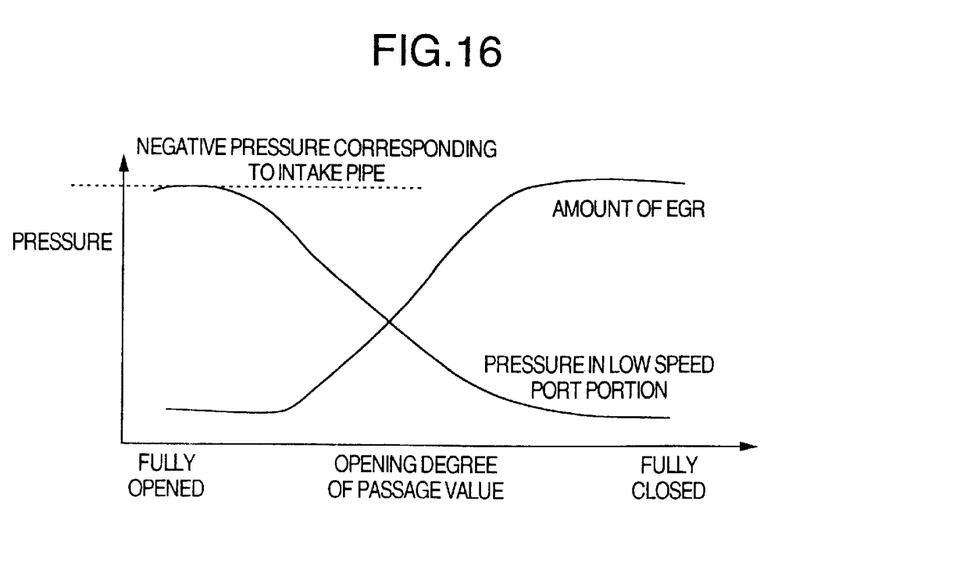
FIG. 16 is a view showing a relation between an amount of EGR and a pressure (negative pressure) of an intake port and a low velocity port portion.

Further, negative pressures at the EGR gas introduction ports 56 are changed by controlling the opening degrees of the passage valves 28 arranged near the upstream ends of the low velocity port portions 26, whereby the passage valves 28 make it possible to adjust amounts of EGR gas introduced (see FIG. 16). Therefore, with the prior art, the use of a stepping motor or the like is necessary to finely control the opening degree of the EGR control valve 55' (FIG. 3) provided in the EGR passage 50 for controlling an amount of EGR gas. With the invention, simple opening and closing of the EGR control valve 55 suffices, so that the use of an inexpensive electromagnetic valve (ON and OFF valve) is made possible to achieve reduction in cost.

Figure 17:
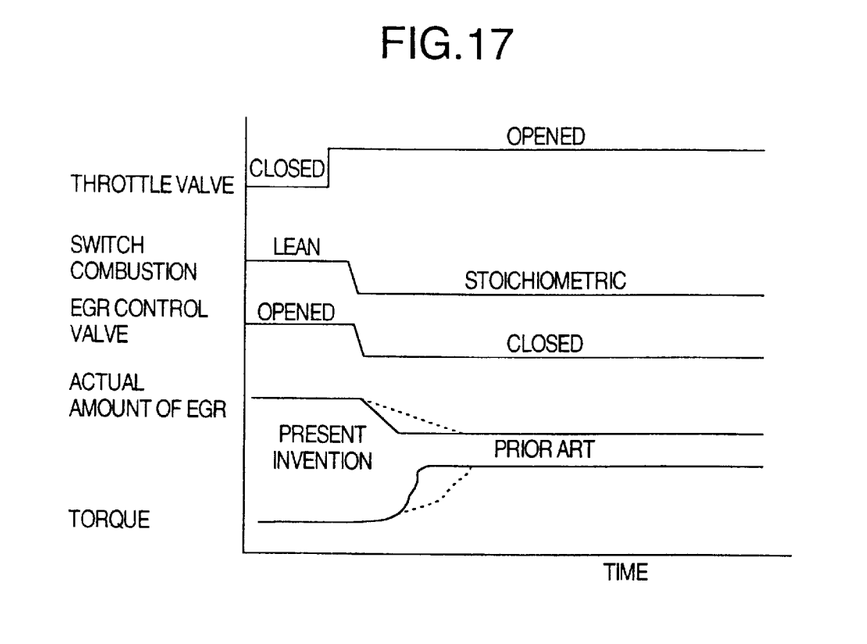
FIG. 17 is a view for explaining a time changing from an EGR executing time to a stopping time.
Figure 18:
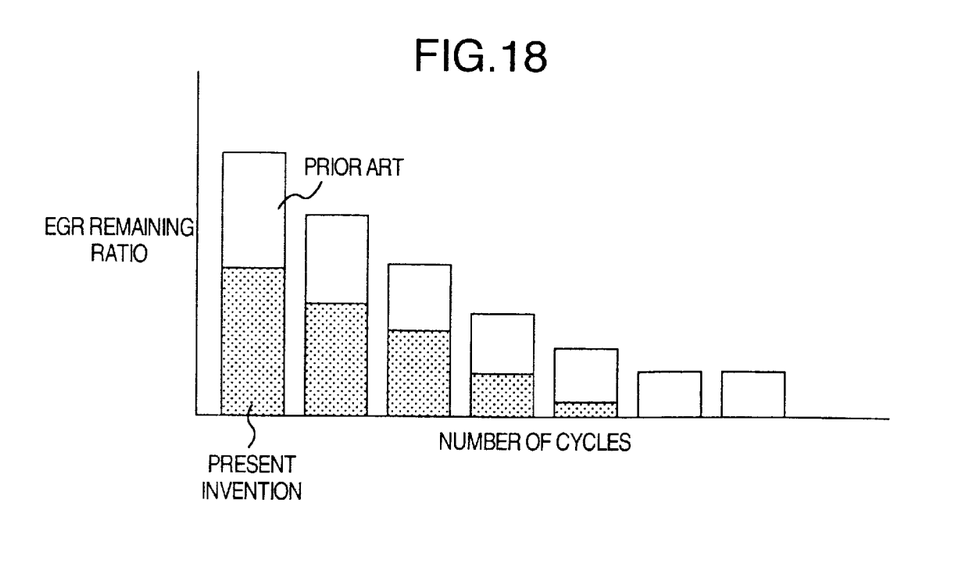
FIG. 18 is a view showing a remaining rate of EGR gas at a changing time from the EGR executing time to the stopping time.

In addition to the above, it takes a comparatively long time and responsibility of increase in torque is deteriorated as shown by broken lines in FIG. 17 and blank portions in FIG. 18 in the case where an EGR gas is introduced in lump into the collecting passage portion 20A (upstream side of the intake ports 21 to 24) of the intake passage 20 in the conventional manner when EGR shift from execution to stoppage, for example, after the throttle valve 31 is opened from its closed position and the EGR control valve 55 is closed, and before recirculation of an EGR gas is actually stopped as shown in FIG. 17. In contrast, according to the invention, there is an advantage that responsibility is enhanced since an EGR gas is introduced individually into (the low velocity port portions) the respective cylinders.

As seen from the description mentioned above, with the direct injection engine according to the invention, the EGR gas is introduced individually into the respective cylinders and an intake air is stratified in the EGR gas level, so that an amount of an EGR gas is reduced in dispersion among the cylinders as compared with the conventional one, and temperature of burning is decreased. Therefore, it is possible to sharply reduce an amount of NOx discharged and to enlarge a limit of stable combustion, and further an intake air is stratified to prolong a period of combustion, thus enabling reduction in an amount of HC discharged owing to afterburning or the like.

Further, negative pressures at the EGR gas introduction ports are changed by controlling the opening degrees of the passage valves arranged near the upstream ends of the low velocity port portions, whereby the passage valves make it possible to adjust amounts of EGR gas introduced. Therefore, with the prior art, the use of a stepping motor or the like is necessary to finely control the opening degree of the EGR control valve provided in the EGR passage for controlling an amount of EGR gas. With the invention, simple opening and closing of the EGR control valve suffices, so that the use of an inexpensive electro-magnetic valve (ON and OFF valve) is made possible to achieve reduction in cost.

What is claimed is:

1. A direct injection engine comprising intake ports for supplying an air and an EGR gas to combustion chambers, fuel injection valves directly injecting a fuel, and ignition plugs, and wherein the air and the EGR gas are supplied to the combustion chambers such that the air having a large flow velocity and the EGR gas having a small flow velocity generate a tumble gas flow so as to provide a state of distribution, in which near the ignition plugs, an air-fuel ratio is on a rich side with a less fresh air and a much EGR gas, and with distance from the ignition plugs, the air-fuel ratio comes to a lean side with a much fresh air and a less EGR gas.

2. The direct injection engine as claimed in claim 1, wherein the intake ports, respectively, in all the cylinders of the engine are compartmented by partitions into a high velocity port portion having a high intake flow velocity and a low velocity port portion having a low intake flow velocity, and wherein EGR gas introduction ports are provided in the low velocity port portions in all the cylinders.

3. The direct injection engine as claimed in claim 2, wherein the EGR passages connect the low velocity port portions of the respective cylinders to exhaust passages, make a single common passage portion at upstream sides thereof and make at downstream sides thereof branch passage portions, which branch from the common passage portion to be connected to the respective low velocity port portions, and wherein an EGR control valve is provided in the common passage portion.

4. A direct injection engine, comprising combustion chambers in which are arranged fuel injection valves directly injecting a fuel and ignition plugs, and intake ports configured to generate a tumble gas flow composed of an air and an EGR gas in the combustion chambers, and partitions compartmenting the respective intake ports into a high velocity port portion having a high intake flow velocity and a low velocity port portion having a low intake flow velocity, wherein passage valves for opening and closing the port portions are arranged near upstream ends of the low velocity port portions so as to generate a negative pressure in the low velocity port portions, and EGR passages for introduction of the EGR gas are connected to the low velocity port portions.

5. The direct injection engine as claimed in claim 4, wherein the intake ports, respectively, in all the cylinders of the engine are compartmented by partitions into a high velocity port portion having a high intake flow velocity and a low velocity port portion having a low intake flow velocity, and wherein EGR gas introduction ports are provided in the low velocity port portions in all the cylinders.

6. The direct injection engine as claimed in claim 4, wherein the EGR passages connect the low velocity port portions of the respective cylinders to exhaust passages, make a single common passage portion at upstream sides thereof and make at downstream sides thereof branch passage portions, which branch from the common passage portion to be connected to the respective low velocity port portions, and wherein an EGR control valve is provided in the common passage portion.

7. The direct injection engine as claimed in claim 5, wherein the EGR passages connect the low velocity port portions of the respective cylinders to exhaust passages, make a single common passage portion at upstream sides thereof and make at downstream sides thereof branch passage portions, which branch from the common passage portion to be connected to the respective low velocity port portions, and wherein an EGR control valve is provided in the common passage portion.

8. The direct injection engine as claimed in any one of claims 4, 2, 5, 6, 3 and 7 wherein an amount of the EGR gas introduced is regulated by controlling opening degrees of the passage valves.

9. A method of effecting stratified charge combustion in a direct injection engine, in which an air and an EGR gas are supplied to combustion chambers and a fuel is directly injected into the combustion chambers, the method comprising the step of effecting stratified charge combustion by producing through a tumble gas flow a state of distribution, in which near ignition plugs in the combustion chambers, an air-fuel ratio is on a rich side with a less fresh air and a much EGR gas, and with distance from the ignition plugs, the air-fuel ratio comes to a lean side with a much fresh air and a less EGR gas.

10. The method of effecting stratified charge combustion in a direct injection engine, as claimed in claim 9, wherein at the time of initial combustion, combustion is effected in a state, in which combustion temperature is suppressed, and after the middle period of combustion, combustion proceeds in a state, in which the combustion temperature is suppressed.

* * * * *